US010635596B2

(12) United States Patent
Saito (10) Patent No.: US 10,635,596 B2
(45) Date of Patent: Apr. 28, 2020

(54) INFORMATION PROCESSING DEVICE, ACCESS CONTROLLER, INFORMATION PROCESSING METHOD, AND COMPUTER PROGRAM FOR ACCESSING MEMORY HAVING ACCESS UNITS OF DIFFERENT SIZES

(71) Applicant: Sony Interactive Entertainment Inc., Tokyo (JP)

(72) Inventor: Hideyuki Saito, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 122 days.

(21) Appl. No.: 15/258,215

(22) Filed: Sep. 7, 2016

(65) Prior Publication Data

US 2017/0097897 A1 Apr. 6, 2017

(30) Foreign Application Priority Data

Oct. 2, 2015 (JP) .................................. 2015-197188
Oct. 2, 2015 (JP) .................................. 2015-197189

(51) Int. Cl.
*G06F 12/0873* (2016.01)
*G06F 12/02* (2006.01)

(52) U.S. Cl.
CPC ...... *G06F 12/0873* (2013.01); *G06F 12/0246* (2013.01); *G06F 2212/1021* (2013.01);
(Continued)

(58) Field of Classification Search
CPC ........... G06F 12/1009; G06F 2212/657; G06F 2212/1008
See application file for complete search history.

(56) References Cited

U.S. PATENT DOCUMENTS 8,555,023 B2 * 10/2013 Schreter ................ G06F 12/023
711/162
2002/0059287 A1 5/2002 Karasudani et al.
(Continued)

FOREIGN PATENT DOCUMENTS

JP 9-185551 A 7/1997
JP 2001-210007 A 8/2001
(Continued)

OTHER PUBLICATIONS

Japanese Office Action dated Jun. 6, 2017 for the Corresponding Japanese Patent Application No. 2015-197188.
(Continued)

*Primary Examiner* — Ann J Lo
*Assistant Examiner* — Michelle T Bechtold
(74) *Attorney, Agent, or Firm* — Katten Muchin Rosenman LLP (57) ABSTRACT

Disclosed herein is an information processing device including a host unit adapted to request data access by specifying a logical address of a secondary storage device, and a controller adapted to accept the data access request and convert the logical address into a physical address using an address conversion table to perform data access to an associated area of the secondary storage device, in which an address space defined by the address conversion table includes a coarsely granular address space that collectively associates, with logical addresses, physical addresses that are in units larger than those in which data is read.

7 Claims, 8 Drawing Sheets

(52) U.S. Cl.
CPC .. *G06F 2212/463* (2013.01); *G06F 2212/657* (2013.01); *G06F 2212/7201* (2013.01)

(56) References Cited

U.S. PATENT DOCUMENTS

| | | | | |
|---|---|---|---|---|
| 2007/0245069 | A1* | 10/2007 | Kikuchi | G06F 12/0246 |
| | | | | 711/103 |
| 2009/0300642 | A1 | 12/2009 | Thaler et al. | |
| 2011/0055458 | A1* | 3/2011 | Kuehne | G06F 12/0246 |
| | | | | 711/103 |
| 2011/0225389 | A1* | 9/2011 | Grisenthwaite | G06F 12/1009 |
| | | | | 711/206 |
| 2013/0326121 | A1* | 12/2013 | Cheng | G06F 12/0246 |
| | | | | 711/103 |

FOREIGN PATENT DOCUMENTS

| | | |
|---|---|---|
| JP | 2006-079434 A | 3/2006 |
| JP | 2011-525010 A | 9/2011 |
| WO | WO 01/16756 A1 | 3/2001 |
| WO | WO 2009/148764 A1 | 12/2009 |
| WO | 2014/132346 | 9/2014 |

OTHER PUBLICATIONS

Japanese Office Action dated Aug. 8, 2017 for the Corresponding Japanese Patent Application No. 2015-197189.

* cited by examiner

INFORMATION PROCESSING DEVICE, ACCESS CONTROLLER, INFORMATION PROCESSING METHOD, AND COMPUTER PROGRAM FOR ACCESSING MEMORY HAVING ACCESS UNITS OF DIFFERENT SIZES

BACKGROUND

The present disclosure relates to an information processing device using a flash memory as a secondary storage device, an access controller, an information processing method and a computer program.

With increase in NAND (Not-AND) flash memory capacities, SSD (Solid State Drive) has come into application as a storage device that replaces a related art HDD (Hard Disk Drive). SSD is advantageous over HDD in that it can access data faster and consumes less power. On the other hand, SSD has a drawback in that it is less durable against repeated rewrites. Therefore, wear leveling, a technique that distributes an area to be rewritten, is used to rewrite data to the SSD. That is, when a rewrite request is issued from a host CPU (Central Processing Unit), a specified logical block address is replaced by a different physical address, thus distributing an area to be rewritten, to the extent possible, to a plurality of memory cells (refer, for example, to WO 2014/132346 A1).

SUMMARY

An address conversion table is necessary for such an arrangement to convert a logical block address into a physical address. An address conversion table generally accounts for about 0.1% in data size of a total SSD capacity. Naturally, a data size of the address conversion table increases with increase in flash memory capacity. It may be possible to cache part of the table to an external DRAM (Dynamic Random Access Memory) so as to efficiently refer to the address conversion table. However, the higher the efficiency pursued, the larger the DRAM capacity necessary. Further, the more frequently the table is referred to, the lower the command processing throughput due to latency involved in accessing the DRAM, possibly impairing the SSD access speed advantage.

The present disclosure has been devised in light of the foregoing, and it is desirable to provide a technology that ensures higher data access efficiency for an information processing device using an SSD.

A mode of the present disclosure relates to an information processing device. The information processing device includes a host unit adapted to request data access by specifying a logical address of a secondary storage device; and a controller adapted to accept the data access request and convert the logical address into a physical address using an address conversion table to perform data access to an associated area of the secondary storage device. An address space defined by the address conversion table includes a coarsely granular address space that collectively associates, with logical addresses, physical addresses that are in units larger than those in which data is read.

Another mode of the present disclosure relates to an access controller. The access controller for controlling data access from a host unit to a secondary storage device in an information processing device, includes a host controller adapted to convert a logical address of an access destination specified by the host unit into a physical address using an address conversion table; and a memory controller adapted to perform data access to the secondary storage device based on the physical address. An address space defined by the address conversion table includes a coarsely granular address space that collectively associates, with logical addresses, physical addresses that are in units larger than those in which data is read.

Still another mode of the present disclosure relates to an information processing method. The information processing method includes, by a host unit, requesting data access by specifying a logical address of a secondary storage device; and, by a controller, accepting the data access request and converting the logical address into a physical address using an address conversion table to perform data access to an associated area of the secondary storage device. An address space defined by the address conversion table includes a coarsely granular address space that collectively associates, with logical addresses, physical addresses that are in units larger than those in which data is read.

Still further mode of the present disclosure relates to a computer program. The computer program for a computer that controls data access from a host unit to a secondary storage device in an information processing device, includes, by a host controller, converting a logical address of an access destination specified by the host unit into a physical address using an address conversion table; and, by a memory controller, performing data access to the secondary storage device based on the physical address. An address space defined by the address conversion table includes a coarsely granular address space that collectively associates, with logical addresses, physical addresses that are in units larger than those in which data is read.

It should be noted that any combinations of the above components and any conversions of expressions of the present disclosure between "method," "device," "system," "computer program," "storage medium storing a computer program," and so on are also effective as modes of the present disclosure.

The present disclosure ensures higher efficiency in an information processing device using an SSD in terms of resources and processing time.

DETAILED DESCRIPTION OF THE PREFERRED EMBODIMENT

Figure 1:
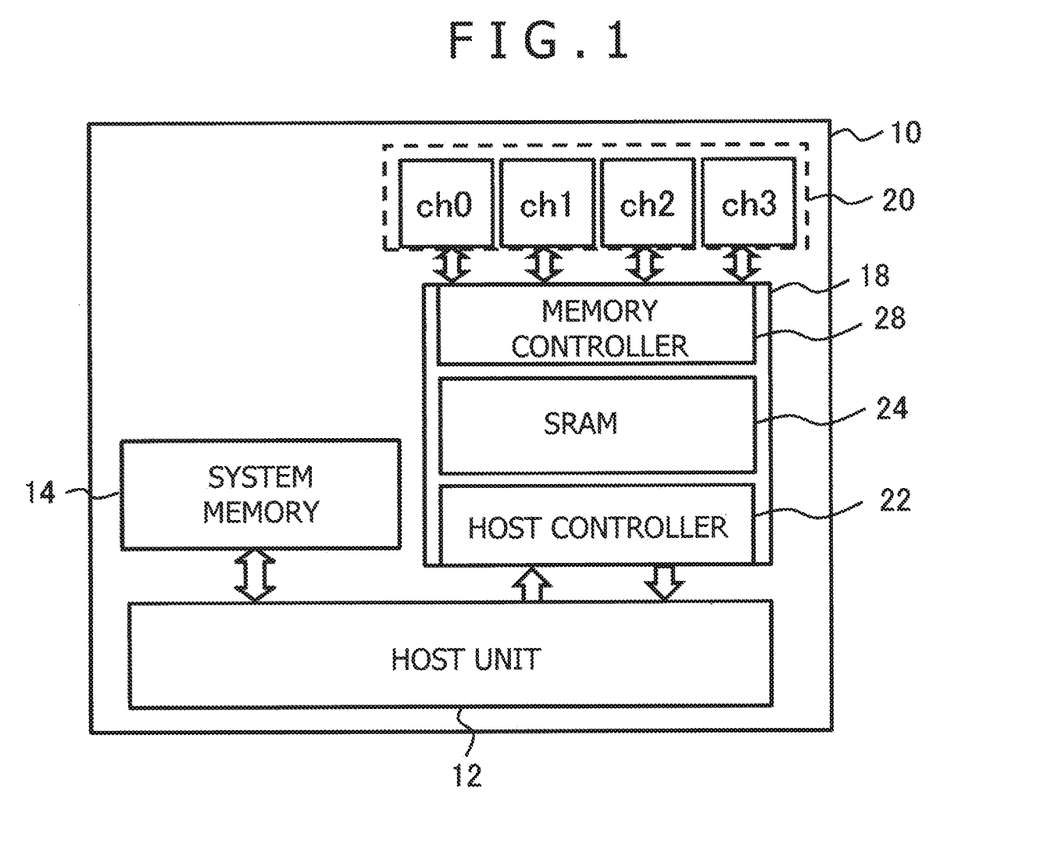
FIG. 1 is a diagram illustrating an internal configuration of an information processing device in the present embodiment.

FIG. 1 is a diagram illustrating an internal configuration of an information processing device in the present embodiment. The information processing device illustrated here may be an ordinary information device such as portable game console, personal computer, mobile phone, tablet terminal, or PDA (Personal Digital Assistant). An information processing device 10 includes a host unit 12, a system memory 14, a NAND flash memory 20 (hereinafter simply referred to as a flash memory 20), and a flash controller 18. The host unit 12 includes a CPU.

The host unit 12 loads programs and data from the flash memory 20 into the system memory 14 for information processing. Further, the host unit 12 reads application programs and data from a storage medium driven by a storage medium driving section not illustrated and downloads such programs and data from a server connected to a network using a communication section, storing the programs and data in the flash memory 20. At this time, the host unit 12 issues, to the flash controller 18, a request to access the flash memory 20. In response, the flash controller 18 reads from or writes to the flash memory 20.

A plurality of NAND flash memories are connected to the flash memory 20. Data is stored in a distributed manner in a plurality of channels (four channels from "ch0" to "ch3" in FIG. 1) as illustrated. The flash controller 18 includes a host controller 22, a memory controller 28, and an SRAM (Static Random Access Memory) 24. The host controller 22 has a function to interface with the host unit 12. The memory controller 28 has a function to interface with the flash memory 20. The operation of the host controller 22 and the memory controller 28 can be implemented by various circuits and devices in terms of hardware and by programs held therein in terms of software. Therefore, it is understood by those skilled in the art that the operation thereof can be implemented in various ways by hardware alone, software alone, or a combination thereof. The present disclosure is not limited to any one of them.

The host unit 12 generates a request to access the flash memory 20 according to progress of an information processing task, storing the request in the system memory 14. The access request includes a logical address (LBA: Logical Block Address) of an access destination. The host controller 22 of the flash controller 18 reads the access request from the system memory 14 and converts the LBA into a physical address of the flash memory 20. At this time, at least part of the necessary address conversion table that was originally stored in the flash memory 20 is located into the SRAM 24.

The host controller 22 supplies the physical address, acquired based on the LBA by referring to the address conversion table, to the memory controller 28. The memory controller 28 accesses and reads data from or writes data to an associated area of the flash memory 20 based on the physical address. In general, data is read from or written to the flash memory 20, for example, in access units of 4096 bytes.

Further, when data is rewritten, data is erased from a target area of the flash memory 20. At this time, data is erased in units of several MiB (1 MiB=$10^{20}$ bytes) blocks. The more data erasure is repeated, the more the flash memory 20 becomes worn. As a result, it is necessary to devise a way to minimize the number of erasures. More specifically, when a data rewrite occurs, pre-rewrite data is not erased to the extent possible. Instead, the data is rewritten to a different area first and then stored, after which the address conversion table is updated such that the area in question is pointed to. On the other hand, data is erased from used areas on a regular basis to ensure that areas that can be newly assigned are not exhausted.

If data is read or written in access units of 4096 bytes as described above, and if data of each entry in the address conversion table is 4 bytes in size, the address conversion table as a whole accounts for 0.1% in data size of the total capacity of the flash memory 20. For example, if the total capacity of the flash memory 20 is 1 terabyte, the address conversion table is 1 gigabyte. It is necessary for the flash controller 18 to refer to the address conversion table first so as to convert a specified LBA into a physical address each time the host unit 12 issues a data access request.

If the address conversion table to be referred to is stored in the flash memory 20, the flash memory 20 is accessed at a higher frequency for address conversion, thus resulting in lower processing throughput and increased latency. Efficiency can be enhanced by caching a large part of the address conversion table, for example, to an external DRAM. The larger the capacity of the flash memory 20, the larger the capacity of a necessary DRAM. Further, DRAM data transfer rate has become dominant, making it difficult to anticipate sufficient improvement in throughput and latency after all.

In the present embodiment, therefore, the address conversion table size is minimized by increasing the data processing unit in response to a write request, i.e., granularity level, at least for part of data. Assuming, for example, that the write granularity level is 128 MiB and that data of each entry in the address conversion table is 4 bytes in size as described above, the data size of the address conversion table as a whole is a $\frac{1}{2^{25}}$th fold of the capacity of the flash memory 20. For example, a 32-KiB ($32 \lambda 2^{10}$ bytes) address conversion table can express 1 TiB ($2^{40}$ bytes) of area.

Thus, storing a sufficiently small-sized address conversion table in the SRAM 24 of the flash controller 18 makes it possible to convert addresses without the mediation of an external DRAM. Making the write granularity coarser is particularly effective, for example, for game programs that are loaded from an optical disc or network, stored in the flash memory 20, and only repeatedly referred to. This means that because stored data is not rewritten, it is not necessary to reserve a new area for storing rewritten data in that unit.

It should be noted that even if data is rewritten at such a coarse granularity level, data continuity is maintained within the write unit in question. During data read, therefore, data can be randomly specified in finer units. On the other hand, it is preferred that saved data or other data whose rewrite is necessary should be written at a finer granularity level. For this reason, a plurality of conversion tables are defined that are different in write granularity level to suit data characteristics. A finely granular address conversion table has a large data size as described above. Therefore, part thereof is cached to the SRAM 24.

Figure 2:
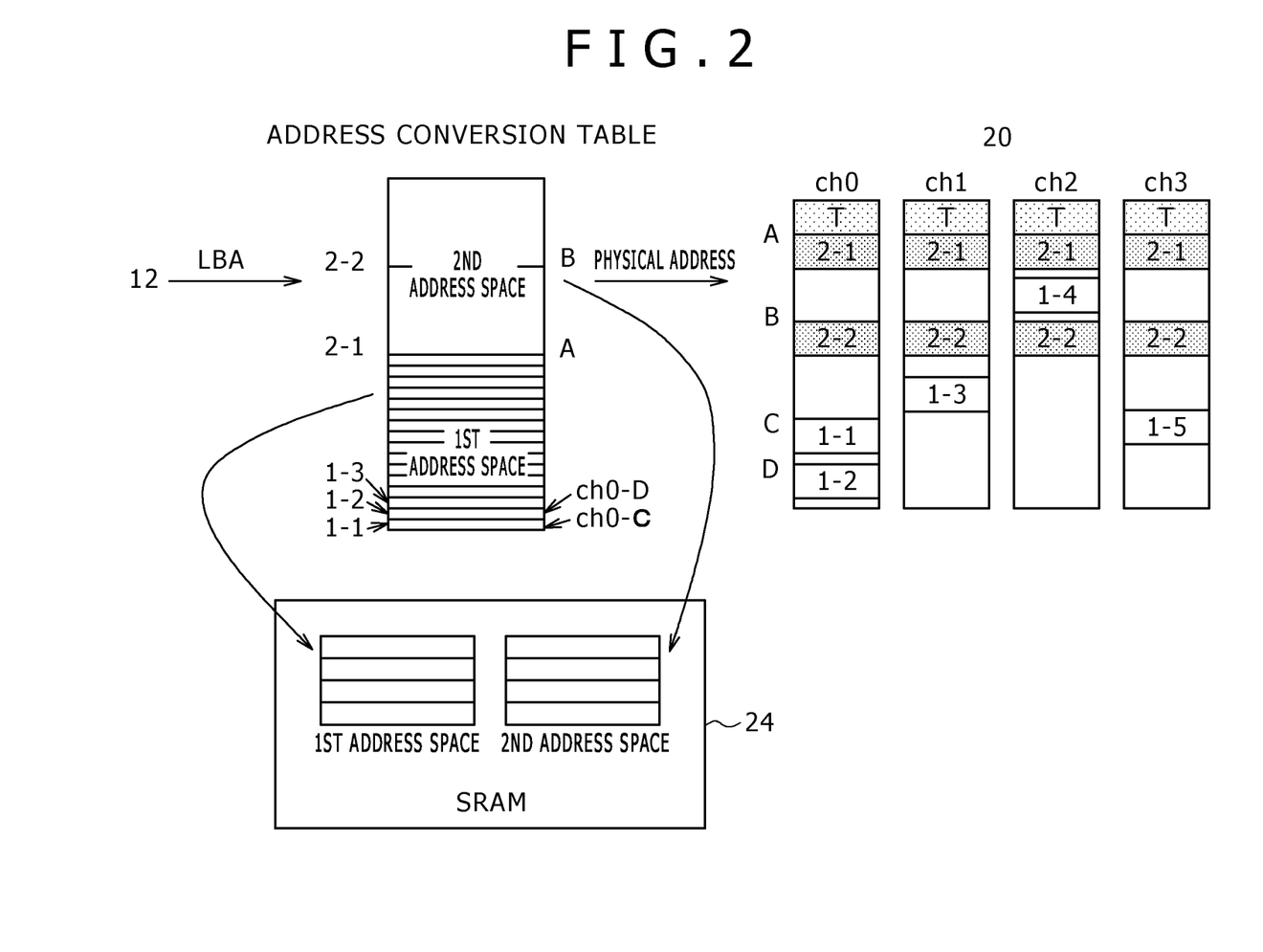
FIG. 2 is a diagram schematically illustrating a relationship between data stored in a flash memory and a configuration of an address conversion table in the present embodiment.

FIG. 2 is a diagram schematically illustrating a relationship between data stored in the flash memory 20 and a configuration of the address conversion table. A plurality of address spaces different in granularity level are defined in the address conversion table. In the example illustrated, the table includes two address spaces, a first address space that is finely granular and a second address space that is coarsely granular. It should be noted that there may be three or more granularity levels. In FIG. 2, an LBA specified by the host unit 12 is represented in a "(address space number)-(address in space)" format. For example, "1-1" represents address "1" in the first address space, and "2-2" address "2" in the second address space. It should be noted, however, that 4-byte or other data that describes an LBA may include other information.

A physical address obtained by address conversion is basically represented in a "(channel number)-(address)" format or in an "address" format. On the other hand, the storage area of the flash memory 20 is represented by a vertically long rectangle for each channel. Of the oblongs obtained by dividing the rectangle, the one marked "T" is an area where an address conversion table is stored. On the other hand, those marked with an LBA such as "1-1" are areas where associated data is stored. The granularity level of data defined in the first address space at the time of write is typically equal to that at the time of read which is, for example, 4 KiB. An LBA is defined for each area of the size in question.

On the other hand, a larger area than can be defined in the first address space can be collectively defined in the second address space by one LBA. In the example illustrated, a continuous area spreads across four channels, namely, ch0 to ch3. The granularity level of data for this address space at the time of write is, for example, 128 MiB. However, the granularity level of data may be determined as appropriate, for example, according to an upper limit of address conversion tables based on the capacities of SRAM 24 and the flash memory 20. This data will not be rewritten by information processing. Therefore, its storage area and data structure will basically remain unchanged.

It should be noted, however, that if data is moved as a result of detection of a bit error due, for example, to deterioration of the flash memory 20 over time, a new continuous area of the size in question is assigned. Further, if a certain block of the flash memory 20 becomes faulty due to an increased erasure count, it becomes difficult to assign a new area also to peripheral blocks included in the write unit as far as data in the second address space is concerned. In contrast, when data defined in the first address space is rewritten or moved, a new area can be assigned at a fine granularity level such as 4 KiB. Further, the finer the granularity level, the smaller the number of blocks to which it becomes difficult to assign a new area in the event of a faulty peripheral block.

Therefore, it is possible to strike a balance between size reduction of the address conversion table and efficiency of the data storage area of the flash memory 20 by changing the granularity level at the time of write according to data characteristics. As for the address conversion table, the portions stored in the "T" areas of the flash memory 20 are read into the SRAM 24 in advance separately for the first and second address spaces. The address conversion table in the second address space is small in data size as described above. Therefore, it is possible to typically achieve a cache hit by preloading all the table at the time of startup.

The address conversion table in the first address space is partially cached according to the capacity of the SRAM 24. Related art techniques can be used for a caching procedure. If the address conversion table stored in the SRAM 24 is updated by moving or rewriting data, the data is written back to the initial table stored in the flash memory 20 at a proper time.

We assume here that the host unit 12 issues a read or write request by specifying LBA="1-1" in the first address space. At this time, the flash controller 18 refers to the address conversion table, thus acquiring a physical address "ch0-C" of the flash memory 20 that is associated therewith. As described above, an LBA is specified for each write unit, and by extension, for each read unit, in the first address space. Therefore, one unit worth of data that starts with the physical address "ch0-C" specified in the address conversion table, i.e., address C of channel number ch0, is read.

In the case of a write request, read data is updated as appropriate and written to a different area of the flash memory 20 first. Then, updating of the physical address in the address conversion table is performed such that the area in question is indicated. On the other hand, if the host unit 12 issues a read request by specifying LBA="2-1" in the second address space, the flash controller 18 calculates the storage area of the read unit data based on physical address "A" given in the address conversion table.

Figure 3:
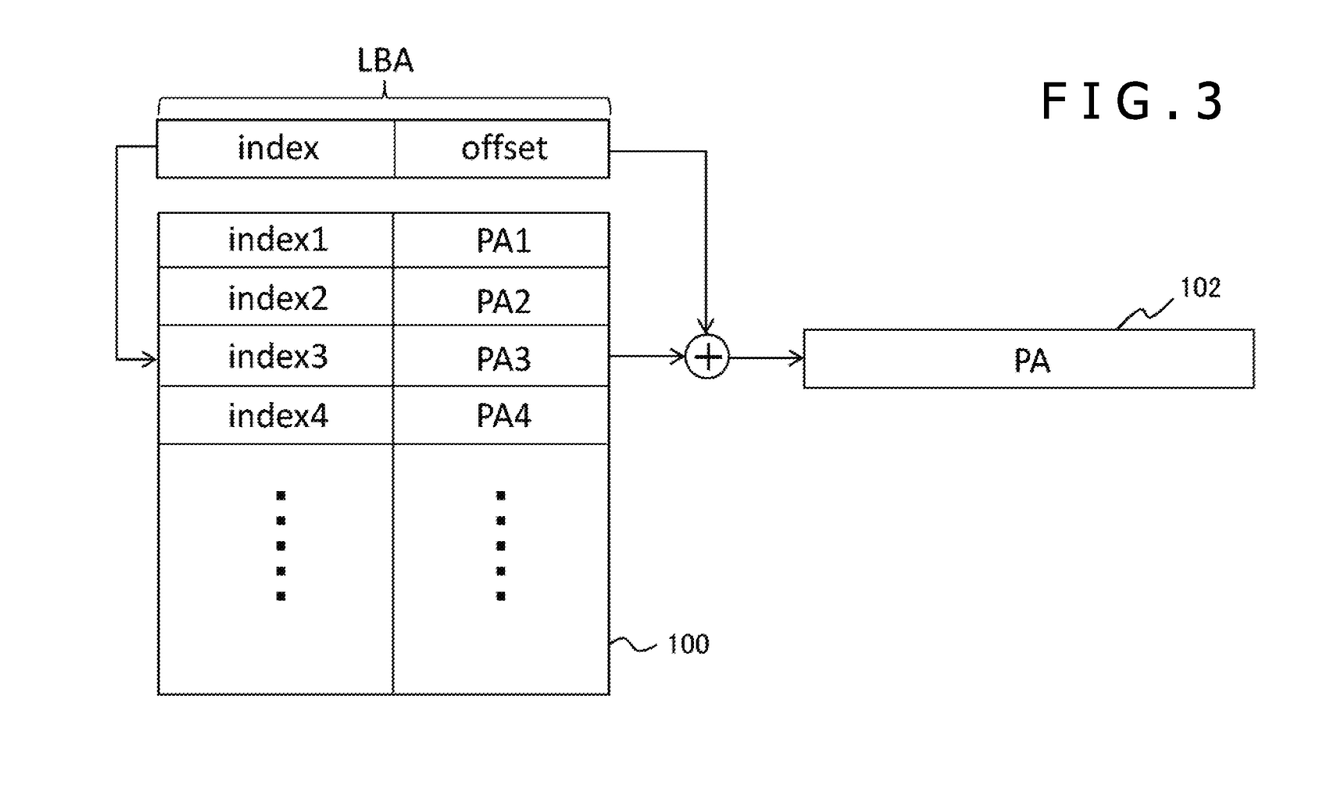
FIG. 3 is a diagram for describing a method by which to acquire a data storage area in a second address space in the present embodiment.

FIG. 3 is a diagram for describing a method by which to acquire a data storage area in the second address space. Higher bits of the LBA in the second address space represent a logical address uniquely given for each write unit area as has been described so far. This address corresponds to "2-1" and so on in FIG. 2. Assuming, for example, that the access granularity level for writing to the second address space is 128 MiB ($2^{27}$ bytes), the address conversion table is 512 B ($2^9$ bytes) in size, and each address space is 1 TiB ($10^{40}$ bytes), bits 31:19 of the LBA 32 bits are higher bits.

The flash controller 18 refers to an address conversion table 100 by using these higher bits as an index, acquiring the PA (physical address) associated therewith. This address corresponds to "A" and so on in FIG. 2 and represents the start physical address of the write unit area. FIG. 3 illustrates that higher bits "index" of the LBA agree with "index3" of the address conversion table 100 and that physical address "PA3" associated therewith is acquired.

In the case of the first address space, it is only necessary to read data from the read unit area whose start address is "PA3" as described above. In the case of the second address space, on the other hand, the flash controller 18 acquires, as a final physical address 102, an address resulting from addition of lower bits of the LBA given as "offset" in FIG. 3 and the physical address "PA3" acquired. Then, the flash controller 18 reads data from the read unit area whose address starts with the physical address 102. The host unit 12 can read a desired portion of the coarsely granular write unit by changing the lower bits of the LBA.

The start address of data stored in the area defined in the second address space changes at a low frequency due to transfer and so forth. However, the internal data structure of the write unit remains unchanged. This makes it possible for the host unit 12 to typically read the same data by indicating the same LBA including the lower bits. It should be noted that assuming that the flash memory 20 has four channels, one chip select, a 4 MiB block size, a 16 KiB page size, one LUN (Logical Unit Number), and two planes, bits of physical address PA[31:0] are assigned as follows.

Offset[13:0]={PA[4:0], 9'b0}
Channel[1:0]=PA[6:5]
Plane=PA[7]
Block=PA[31:8]/(4*1024/16)
Page=PA[31:8]%(4*1024/16)

A description will be given next of the host unit 12 in the present embodiment. Each of the NAND devices making up the flash memory 20 has a higher transfer rate at the time of realizable read than and is one tenth or less in latency as compared to one HDD. Thanks to a large number of NAND devices incorporated, a large-capacity SSD offers a dramatically higher transfer rate than HDD. However, it is difficult for the majority of SSDs to take full advantage of a high transfer rate of the devices themselves because of a host interface of the flash controller as a bottleneck.

In general, data stored in an HDD is divided into 512- or 4096-byte blocks and recorded in a distributed manner. A file system has metadata that makes distributed data look like one piece of continuous data, converting an instruction to access a continuous file area into that to access a plurality of distributed blocks. Because the HDD stores metadata for converting the name of the file to be accessed into the LBA associated with each block of the HDD, it is necessary to read metadata first so as to read the file.

Metadata itself may be distributed over a plurality of areas of the HDD. It is likely, therefore, that small data access to the HDD such as reading higher-order metadata to read the metadata in question may occur frequently due to metadata layering. During that period, it is difficult to acquire the logical block address of the area to be accessed where data is stored. Therefore, it is difficult for a CPU to issue a next read request. Applying such a data access procedure to the SSD in an "as-is" manner makes it difficult to achieve a high transfer rate that could otherwise be achieved by parallel access to a plurality of NAND devices.

Further, ordinary HDDs have no encryption or anti-tampering function. Therefore, it is necessary for the host CPU to handle encryption and tampering check. Encryption and tampering check may be performed at a BIOS (Basic Input/Output System) level or at a file system level. In either case, these tasks are handled by the CPU. Therefore, these processing tasks may become a bottleneck to a high SSD transfer rate. Although distribution of load of these processing tasks using an accelerator may be possible, it is necessary, for that purpose, to divide a read file into processing units and issue a number of processing requests for those processing units, thus making it difficult to reduce CPU processing load.

Further, a number of interrupts may be generated to notify completion to such a number of processing requests, possibly disrupting CPU processing. On the other hand, some file systems support data compression. In this case, the file system compresses data during file write and decompresses data during file read. At this time, if the interface speed of the data storage destination is low, the effective transfer rate may improve by reduction of data amount. However, data compression and decompression may become a bottleneck to a high SSD transfer rate.

Thus, although the transfer rate of NAND flash devices alone improves dramatically, incorporation of the devices into a system designed for an HDD leads to a variety of bottlenecks. As a result, such improvement in transfer rate is frequently not fully taken advantage of. To alleviate these various bottlenecks, a high-speed access software stack is available in the present embodiment in addition to a related art file system. The related art file system is accessed via a virtual file system to adapt to various storage devices and network file systems. For this reason, metadata is structured into a plurality of layers as described above. As a result, there are cases in which metadata is read a number of times before an intended file is read.

In the present embodiment, metadata is simplified by providing a high-speed access software stack specially designed for flash memories. Further, in the present embodiment, an auxiliary processor is provided in addition to a related art CPU to mainly execute and control the software stack in question so that the auxiliary processor takes charge of controlling a hardware accelerator for encryption and decryption, tampering check, and data decompression, thus distributing processing. Still further, the data read unit of the flash memory is expanded and unified for efficient read operations.

Figure 4:
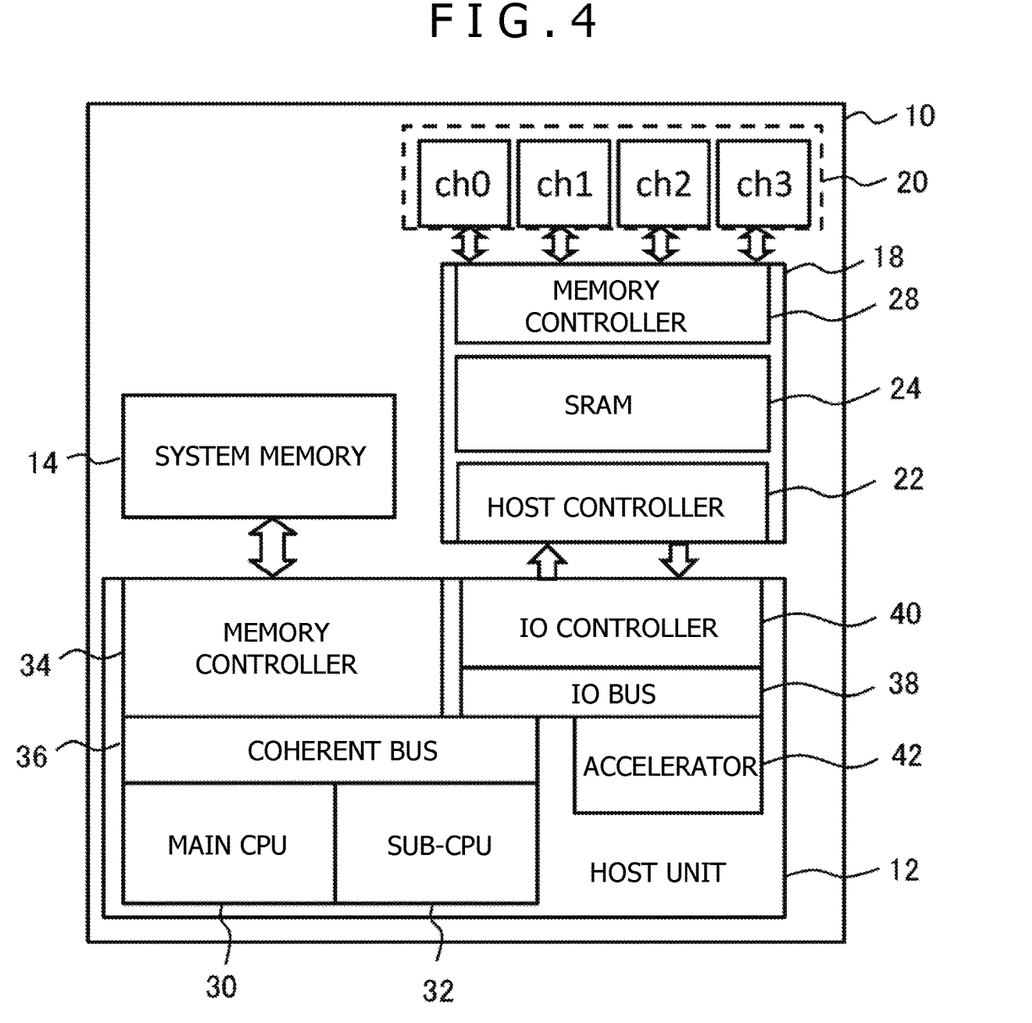
FIG. 4 is a diagram illustrating an internal configuration of the information processing device in the present embodiment.

FIG. 4 illustrates an internal configuration of the information processing device in the present embodiment. It should be noted that FIG. 4 illustrates, in details, a configuration of the host unit 12 of the internal configuration of the information processing device 10 illustrated in FIG. 1. Therefore, the flash memory 20, the system memory 14, and the flash controller 18 may be the same as in FIG. 1. It should be noted, however, that the address conversion table for the flash controller 18 to convert an LBA into a physical address may include a plurality of address spaces with different granularity levels as described above or may have a unified granularity level.

The host unit 12 includes a main CPU 30, a sub-CPU 32, and a memory controller 34 connected together by a coherent bus 36. An IO (Input/Output) bus 38 is also connected to the coherent bus 36. An IO controller 40 and an accelerator 42 are connected to the IO bus 38. The main CPU 30 loads programs and data from the flash memory 20 into the system memory 14 for information processing.

The sub-CPU 32 is an auxiliary processor that mainly takes charge of processing for data access to the flash memory 20. The sub-CPU 32 may be a processor core as used for a so-called embedded processor that is small in chip area although it has lower computational capability than the main CPU 30. Although it is not necessary for the main and sub-CPUs 30 and 32 to have the same instruction set architecture and operating system, the main and sub-CPUs 30 and 32 are connected by the coherent bus 36 and their page sizes are the same so that data stored in the system memory 14 can be shared between them.

The sub-CPU 32 divides a file read request issued by the main CPU 30 into read requests for data of a given size, storing the requests in the system memory 14. Thus, in the present embodiment, hardware other than the main CPU 30 handles the major part of data access to the flash memory 20, and the read unit is reduced to a finer one immediately after issuance of a file access request. This allows for parallel access to a plurality of NAND devices, thus providing a high transfer rate. Further, affinity with processing handled by the accelerator 42 such as read data buffering to a built-in SRAM, encryption, and tampering check is enhanced in terms of data size, thus preventing disruption of processing halfway.

The IO bus 38 has the accelerator 42 that handles encryption, data tampering check, and data decompression. Further, data is read from the system memory 14 by a DMAC (Direct Memory Access Controller) not illustrated, subjected to encryption, tampering check, and decompression, and then stored again in the system memory 14 by the DMAC. The flash controller 18 reads a data access-related instruction, issued by the host unit 12, from the system memory 14, reading data from or writing data to the flash memory 20.

The flash controller 18 stores data, read from the flash memory 20, in the built-in SRAM 24 temporarily, subjects the data to ECC (Error-Correcting Code) check, and transfers it to the system memory 14. The memory controller 34 and IO controller 40 of the host unit 12 have ordinary functions to interface with the system memory 14 and the flash controller 18, respectively.

Figure 5:
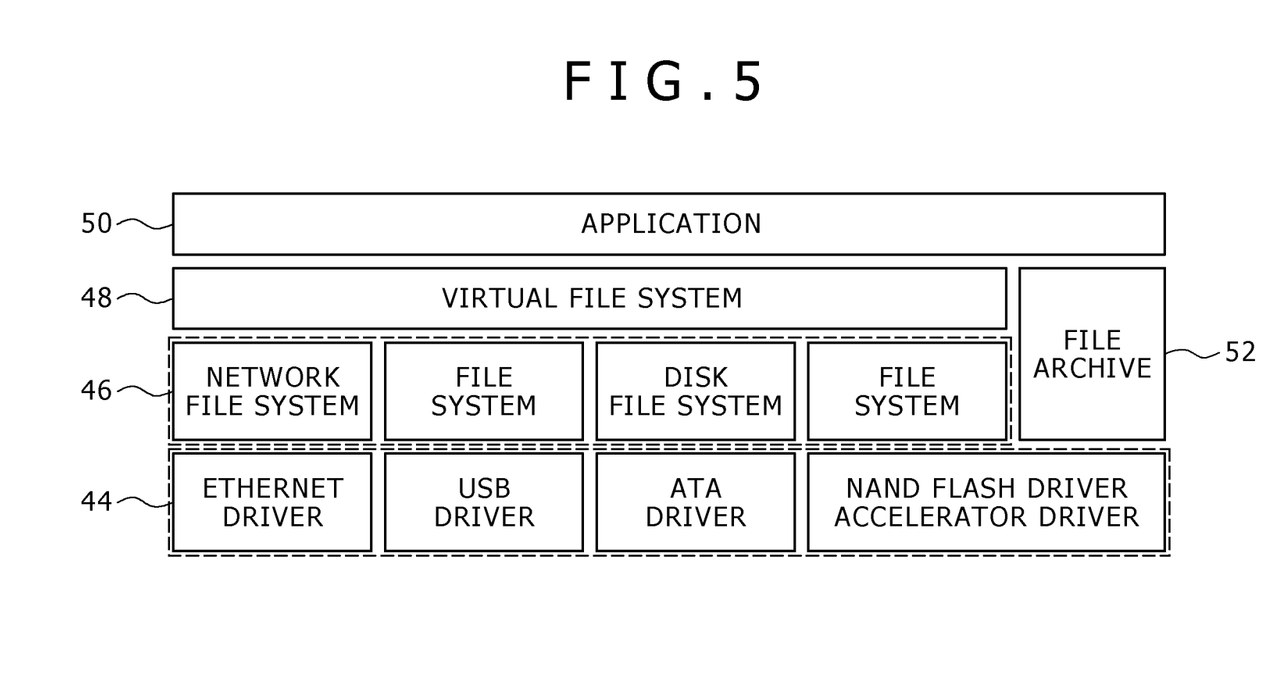
FIG. 5 is a diagram illustrating a configuration of a software stack in the present embodiment.

FIG. 5 is a diagram illustrating a configuration of software stack in the present embodiment. In an ordinary technique, when a command is issued from an application 50 at an uppermost layer, processing of a virtual file system 48 is performed by a system call. This causes local file systems 46 such as network file system and disk file system to be called up, thus achieving access to the device driver 44 for the respective file systems. That is, the virtual file system 48 is an abstraction layer that provides a function to treat the local file systems 46 for a variety of devices by a common method in the application 50.

The virtual file system 48 manages directory entry information that makes up metadata and interprets file names and paths, thus calculating where in each device data is located. At this time, complicated processing such as directory tree search, exclusive control, and cache management, is involved. Therefore, processing is particularly likely to be disrupted when a large number of small files are opened. For this reason, a layer called a file archive 52 is defined separately from the virtual file system 48 in the present embodiment. The application 50 accesses a file via an API (Application Programming Interface) specific to the file archive.

The file archive 52 is an interface between a NAND flash driver that runs the flash memory 20 and an accelerator driver that runs the accelerator 42 and the application 50, notifying an access request from the application 50 directly to the drivers. This simplifies acquisition of data storage areas for files. Further, target data is stored in the flash memory 20 in a specific format such that the access request divided into small units can be smoothly processed in parallel.

More specifically, files accessed via the file archive 52 are divided in advance into blocks of a fixed length such as 64 KiB, compressed, and stored. Further, these files are rendered read-only, thus maintaining consistency even if a plurality of processes of the application 50 simultaneously access the files. This ensures that a plurality of file accesses can be processed in parallel even without performing synchronous processing, thus providing a higher transfer rate thanks to a synergetic effect with data size reduced by compression.

Figure 6:
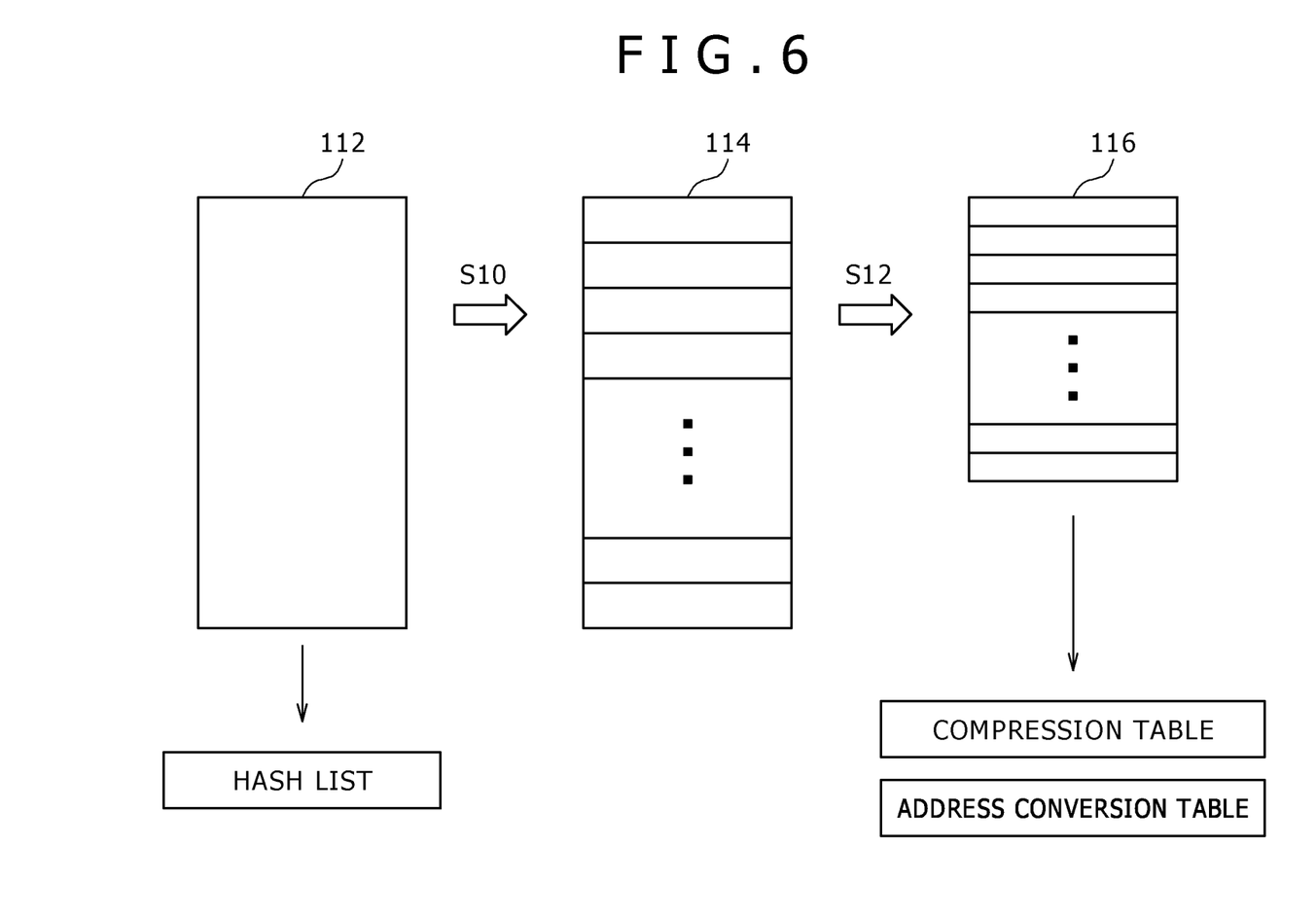
FIG. 6 is a diagram schematically illustrating a procedure for a file archive and a flash controller in the present embodiment to store file data to be processed in a flash memory.

For example, files that are only repeatedly referred to such as game programs as described above are suitable for being processed by the file archive. Thus, whether or not a file is to be processed by the file archive 52 is determined as appropriate according to data characteristics. FIG. 6 schematically illustrates a procedure for the file archive 52 and the flash controller 18 to store file data to be processed in the flash memory 20. The main CPU 30 or the sub-CPU 32 mainly takes charge of executing the file archive in this stage. First, the file archive 52 writes a file 112 to be processed to a continuous area of the flash memory 20.

Although FIG. 6 illustrates only the one file 112, a plurality of files are actually stored together in a continuous area. For example, a write request is issued such that a plurality of program files read from an optical disc are written to a continuous area at a coarse granularity level such as 128 MiB. The actual write process is handled by the flash controller 18. Here, the file archive 52 generates a hash list such that a logical address of a storage destination area can be looked up directly from a file name. That is, a hash value of a fixed length is generated from a file name using a given hash function, thus sorting the entry indicating the logical address of the file in question with the hash value and generating a hash list. However, this does not mean that an address search mechanism is limited thereto.

Next, the file archive 52 divides the target file 112, stored in a continuous area of the flash memory 20 as described above, into blocks of a given size (S10). For example, if the 16 MiB file 112 is divided into 64 KiB units, a group 114 of 256 blocks is formed. Further, the file archive 52 compresses each block and requests the flash controller 18 to store data 116 that is made up of a group of compressed blocks in a different area of the flash memory 20 (S12). In this case, data is also written to a continuous area at a coarse granularity level such as 128 MiB.

The flash controller 18 not only handles the data storage in question but also generates an address conversion table for associating a logical address of compressed data and a physical address of an area where the actual data is stored. Associating compressed data with a logical address at a coarse granularity level allows the second address space to be defined as illustrated in FIG. 2, thus contributing to reduced data size of an address conversion tale 64. On the other hand, the file archive 52 generates a compression table that associates logical addresses before and after block compression.

Figure 7:
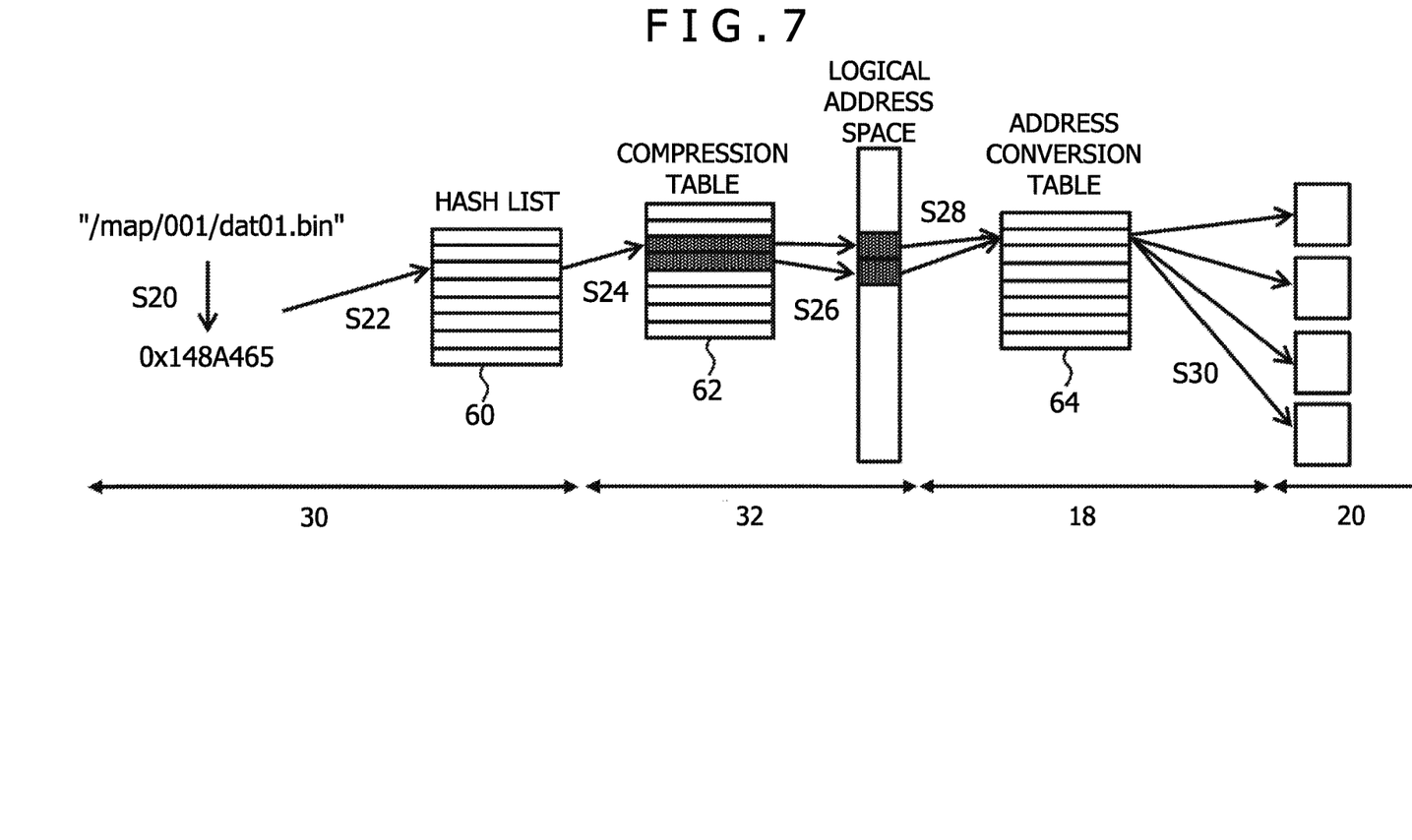
FIG. 7 is a diagram schematically illustrating a processing procedure followed until a requested file is accessed using the file archive in the present embodiment.

FIG. 7 schematically illustrates a processing procedure followed until a requested file is accessed using the file archive. First, when it is necessary for the main CPU 30 that processes the application 50 to read a file in the process of processing, the main CPU 30 calls up an API of the file archive by specifying the file name in question. In FIG. 7, "/map/001/dat01.bin," a path and a file name, are specified. Thanks to the API, the main CPU 30 acquires the logical address associated with the specified file by using the above hash list. A hash list 60 is loaded in advance into the system memory 14 from the flash memory 20.

Then, the file archive 52 derives a hash value using the same hash function as when the hash list was generated based on the file name specified in the application 50 (S20), and acquires the corresponding logical address, for example, by performing binary search of the hash list 60 (S22). When the acquired logical address is notified to the sub-CPU 32, the sub-CPU 32 takes over processing. As a result, the main CPU 30 is temporarily relieved from processing of the file archive 52. The sub-CPU 32 refers to a compression table 62 that has been loaded into the system memory 14, acquiring the post-compression logical addresses of a plurality of blocks resulting from division of the file from the notified file logical address (S24 and S26).

Then, the sub-CPU 32 generates a read request by specifying, for each compressed block, the acquired logical address in the LBA format, issuing the request to the flash controller 18 (S28). That is, the sub-CPU 32 converts a read request issued by the main CPU 30 for a single file into a plurality of read requests in block units. In the case of the 16 MiB file, 256 read requests are issued in 64 KiB units. It should be noted that the sub-CPU 32 reserves a storage area of read data in a kernel area of the system memory 14 when read requests are issued.

In response thereto, the flash controller 18 converts the LBA into a physical address using the address conversion table 64 in the same manner as described in FIG. 2, acquiring data of the corresponding address from the flash memory 20 (S30). During address conversion, if a read request is issued from the file archive, the flash controller 18 refers to the address conversion table 64 by using the higher bits of the LBA as an index as described above and acquires the physical address of each requested block by adding the lower bits of the LBA and the physical address associated therewith.

Figure 8:
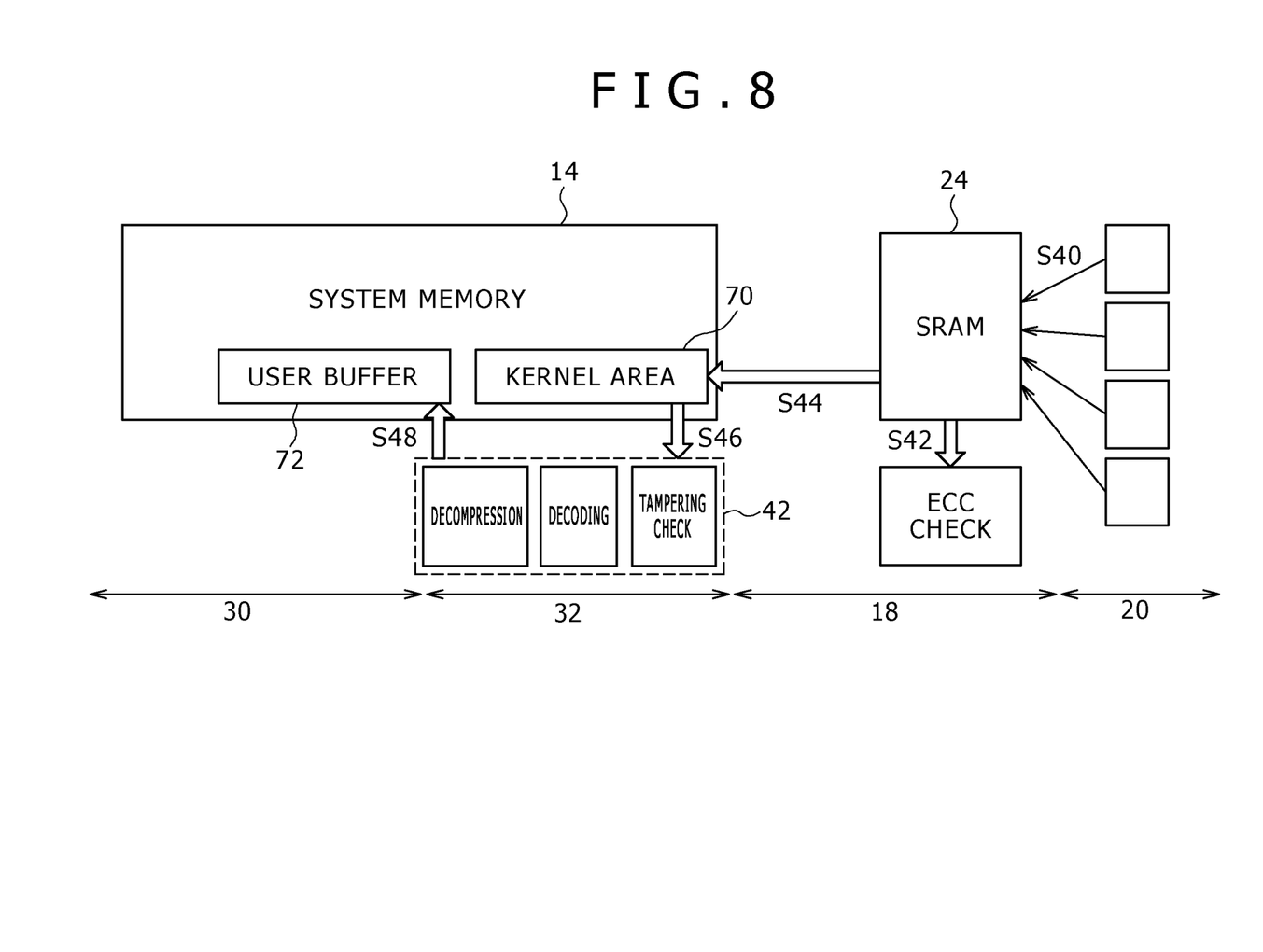
FIG. 8 is a diagram schematically illustrating a processing procedure followed until reading of a requested file is complete using the file archive in the present embodiment.

FIG. 8 schematically illustrates a processing procedure followed until reading of a requested file is complete using the file archive. First, the flash controller 18 reads data requested by the flash memory 20 and loads it into the built-in SRAM 24 as described in FIG. 7 (S40). This data is in units resulting from division of the original file into blocks and compression thereof. Therefore, the data is of a size that can be properly stored in the SRAM 24. Then, the flash controller 18 performs ECC check on the data in these units (S42).

When the data passes the ECC check, the data in question is stored in a kernel area 70 of the system memory 14 reserved in advance by the sub-CPU 32, for example, by a DMAC not illustrated, and the sub-CPU 32 is notified to that effect (S44). It should be noted that if an error is detected during the ECC check, the flash controller 18 generates a request again, thus reading data again. The flash controller 18 repeats this processing task until all processing for the read requests in small units issued by the sub-CPU 32 are complete.

The sub-CPU 32 issues a request to the accelerator 42 to check for tampering, decode, and decompress the data read into the kernel area 70 in response to the notice from the flash controller 18 (S46). The accelerator 42 performs these tasks for each piece of data stored, storing processed data, i.e., block data making up the file, in a user buffer 72 of the system memory 14 and notifying the sub-CPU 32 (S48).

The sub-CPU 32 notifies the main CPU 30 of the read completion by using an interrupt or process-to-process communication when all the block data making up the request file is available. In response, the main CPU 30 performs post-processing accompanied by API processing of the file archive as appropriate, giving processing back to the application. In the present embodiment, a file stack is formed where the file archive 52 and the virtual file system 48 coexist as illustrated in FIG. 5. As described above, in response to a request from the file archive 52, the flash controller 18 performs address conversion using the second address space in which data is written at a coarse granularity level.

In response to a request from the virtual file system 48, on the other hand, the flash controller 18 may perform address conversion using the first address space in which data is written at a finer granularity level. In this case, two address conversion tables, one for each address space, are stored in the SRAM 24 separately as illustrated in FIG. 2, and the tables to be referred to are switched in accordance with whether the requester is the file archive 52 or the virtual file system 48. The requester can be identified by the higher bits of the LBA included in the access request.

To ensure a high transfer rate for a read request from the file archive 52, processing for the request may be performed with higher priority than processing for a read/write request from the virtual file system 48 or that for a compressed data write request from the file archive 52. Priority control and transfer rate management are handled by the sub-CPU 32 that issues a request to the flash controller 18 or the flash controller 18 that receives a request. During a period of time in which data is read in response to a request from the file archive 52, other read requests are prohibited, thus preventing possible erasure of data to be read and prohibiting data erasure by garbage collection as long as no error occurs.

Next, performance of the information processing device 10 having the above configuration will be investigated. Processing time allowed to achieve a desired transfer rate is as shown in the table below. To provide 1 GB/second transfer rate, for example, at 4 KiB data granularity level per request (processing unit), it is necessary to complete processing in 4.1 μseconds per request. If the time to processing completion is longer than that, the transfer rate will naturally be lower.

TABLE 1

| Processing unit | 1 GB/second | 5 GB/second | 10 GB/second | 20 GB/second |
|---|---|---|---|---|
| 4 KiB | 4.1 | 0.8 | 0.4 | 0.2 |
| 64 KiB | 66 | 13 | 6.6 | 3.3 |
| 1 MiB | 1049 | 210 | 105 | 52 |
| 16 MiB | 16,777 | 3,355 | 1,678 | 839 |

Unit: μsecond

The main CPU 30 handles the following processing in the present embodiment as described above.
1. Calculate a hash value from a file name
2. Search a hash list
3. Issue a request to the sub-CPU 32

If a file size is small such as 4 KiB or so, it is necessary to complete processing within 0.4 μseconds per file so as to provide a 10 GB/second transfer rate. If read requests in such small units are issued frequently, parallelization effects will be marginal. Besides, the transfer rate of the main CPU 30 is more likely affected by the transfer rates of the sub-CPU 32, the flash controller 18, and the flash memory 20, easily increasing latency and resulting in a lower transfer rate of the main CPU 30. Therefore, if a data access request in such a small size occurs every millisecond or so, a plurality of files are combined into a single file and a data access request is issued in units of 10 MiB or so, thus providing a 10 GB/second transfer rate with high robustness.

The sub-CPU 32 handles the following processing in the present embodiment.
1. Divide a request issued by the main CPU 30 into data blocks of a fixed length
2. Acquire a logical address of an area where compressed data is stored by referring to a compression table
3. Issue a read request to the flash controller 18
4. Request the accelerator 42 to perform processing such as tampering check on read data
5. Notify the main CPU 30 when the blocks making up the original file are ready The sub-CPU 32 processes data in fixed length units. Assuming, for example, that data is processed in 64 KiB units, it is necessary to complete processing in 6.6 μseconds per request so as to provide a 10 GB/second transfer rate. For example, if the main CPU 30 issues a request to read a 16 MiB file, the sub-CPU 32 divides the request into 64 KiB units and issues 256 read requests as described above. At this time, it is not that one request is processed in 6.6 μseconds, and that, instead, the plurality of requests are processed altogether.

In the present embodiment, only simplified processing tasks such as issuance of commands to the flash controller 18 and various accelerators and reception of completion notices can be performed in parallel at high frequency. This makes it possible, for example, to complete processing of 32 requests or so within 211 μseconds, thus achieving a 10 GB/second transfer rate. Depending on the transfer rate to be achieved, foe example, processing tasks such as issuance of commands to the flash controller 18 and reception of completion notices may be distributed further to a plurality of CPU cores.

The flash controller 18 handles the following processing in the present embodiment.
1. Read requests issued by the sub-CPU 32
2. Refer to the address conversion table and convert an LBA into a physical address
3. Read data from an associated area of the flash memory 20

4. Store data in the system memory 14 and notify the sub-CPU 32 of that effect In address conversion for which fast processing is desired, the address conversion table to be referred to is stored in the built-in SRAM 24. If a request from the sub-CPU 32 is in 64 KiB units, it is necessary to complete processing in 6.6 μseconds per request so as to provide a 10 GB/second transfer rate. If this is converted into 151,515 IOPS (Input Output Per Second), it is preferred to distribute processing to a plurality of processor cores as is done for the sub-CPU 32. Further, the flash controller 18 has a plurality of interface channels for the flash memory 20 as described above, thus dividing the read request further for each channel. For example, if a 64 KiB data read request is divided into 16 KiB units, a four-fold IOPS is necessary. However, these units are processed in parallel by a plurality of channels. As a result, the transfer rate is not affected so much.

The accelerator 42 handles the following processing in the present embodiment.
1. Receive processing requests from the sub-CPU 32
2. Read data from the system memory 14
3. Perform tampering check, decoding, and decompression
4. Store processed data in the system memory 14 and notify the sub-CPU 32

In the case of running at a throughput equal to or higher than 10 GB/second on average, it is necessary for the accelerator 42 to have a peak throughput equal to or higher than 10 GB/second on average considering overhead between processing tasks. If a circuit runs at 128 bit/cycle and 1 GHz, its peak throughput amounts to 16 GB/second, a sufficient level. On the other hand, if 16 cycles are required for the circuit to perform 128-bit processing, a countermeasure may be taken such as arranging 16 accelerators 42 side by side.

In the present embodiment described above, the granularity level of access to write to the flash memory is larger than the related art write granularity level such as that on a page-by-page basis. This brings the entire address conversion table down to a size that can be stored in a built-in SRAM, thus making it unnecessary to repeatedly access the flash memory for address conversion. Further, even if the capacity of the flash memory is larger, it is no longer necessary to provide a large-capacity external DRAM so as to cache the address conversion table. As a result, it is possible to not only prevent increased latency and lower throughput resulting from access to the flash memory and the external DRAM but also provide reduced manufacturing costs and chip area.

Still further, the address conversion table is divided into a plurality of address spaces with different write access granularity levels, thus making it possible to select an address conversion table that suits data characteristics. The address conversion table that defines an address space at a fine granularity level is partially cached to the SRAM. For example, a large granularity level is assigned to game programs and other data that is not updated, and a fine granularity level to user data that is often updated. This makes it possible to assign areas in a waste-free way in consideration of characteristics of the flash memory with which it is required to reserve a new area when updating data, thus striking a balance with effects of increasing a granularity level.

Further, a processor that handles access requests to the flash memory is provided separately from the main processor. This processor divides an access request for each file into small units such that subsequent processing is performed in parallel, to the extent possible, in these units. In response thereto, the flash memory stores compressed data for each of the blocks resulting from division of the file. This configuration provides substantially improved processing speed for each access request. Further, read data is in smaller size, thus making it possible for the SRAM built in the flash controller to buffer the data and making it unnecessary to cache it to an external DRAM.

Still further, an interface layer is provided in the software stack to directly link the application and the SSD in addition to a related art file system, thus contributing to simpler processing up to address acquisition from a file name. Moreover, priority is given to read access depending on whether the read access requester is the interface layer in question or the related art file system. Higher priority is given to the former, and the read unit is increased as compared to related art for more efficient read processing. This makes it possible to differentiate data read processing that necessitates fast read such as program files from ordinary file read processing such as user data.

Simplifying metadata necessary for processing up to address acquisition from a file name makes it unnecessary to trace back the layered metadata. Further, the metadata itself can be reduced in size, thus making it possible to store the entire metadata in the system memory. This contributes to significantly reduced load of memory access processing for address acquisition. The above configuration allows for high-speed data access that takes full advantage of a high transfer rate of the flash memory while at the same time permitting coexistence with data access procedures for various related art storages.

The present disclosure has been described based on an embodiment. The embodiment is illustrative, and it is to be understood by those skilled in the art that combinations of the components and processes can be modified in various ways and that such modification examples also fall within the scope of the present disclosure.

The present technology contains subject matter related to that disclosed in Japanese Priority Patent Application JP 2015-197188 filed in the Japan Patent Office on Oct. 2, 2015, the entire content of which is hereby incorporated by reference.

What is claimed is:

1. An information processing device comprising:
a host unit adapted to request data access by specifying a logical address of a secondary storage device; and
a controller adapted to accept the data access request and convert the logical address into a physical address using an address conversion table to perform data access to an associated area of the secondary storage device, wherein
an address space defined by the address conversion table that comprises:
a coarsely granular address space that collectively associates, with logical addresses, a first plurality of physical addresses that are in units larger than those in which data is read; and
a finely granular address space that associates, with logical addresses, a second plurality of physical addresses that are in units equal to those in which data is read,
wherein the controller changes part of the address conversion table that defines the finely granular address space according to the data access request and stores the address conversion table, and
wherein the first plurality of physical addresses do not overlap with the second plurality of physical addresses, and wherein the first plurality of physical addresses are only used by the controller for read operations and not write operations after an initial write operation from an external source at a start of execution of an application program, wherein an entirety of the address conversion table is stored on a built-in static random access memory, and wherein the address conversion table occupies $(½)^{25}$ fold of a total data size of the secondary storage device.

2. The information processing device of claim 1, wherein when a data write request is accepted from the host unit, the controller changes an area size of the secondary storage device to be written to according to the address space to which the specified logical address belongs.

3. The information processing device of claim 1, wherein when a data read request is accepted from the host unit, the controller changes a procedure for deriving a physical address according to the address space to which the specified logical address belongs.

4. An access controller for controlling data access from a host unit to a secondary storage device in an information processing device, the access controller comprising:
a host controller adapted to convert a logical address of an access destination specified by the host unit into a physical address using an address conversion table; and
a memory controller adapted to perform data access to the secondary storage device based on the physical address, wherein
an address space defined by the address conversion table that comprises:
 a coarsely granular address space that collectively associates, with logical addresses, a first plurality of physical addresses that are in units larger than those in which data is read; and
 a finely granular address space that associates, with logical addresses, a second plurality of physical addresses that are in units equal to those in which data is read,
wherein the memory controller changes part of the address conversion table that defines the finely granular address space according to the data access request and stores the address conversion table,
wherein the first plurality of physical addresses do not overlap with the second plurality of physical addresses,
wherein the first plurality of physical addresses are only used by the memory controller for read operations and not write operations after an initial write operation from an external source at a start of execution of an application program
wherein an entirety of the address conversion table is stored on a built-in static random access memory, and
wherein the address conversion table occupies $(½)^{25}$ fold of a total data size of the secondary storage device.

5. An information processing method comprising:
by a host unit, requesting data access by specifying a logical address of a secondary storage device; and
by a controller, accepting the data access request and converting the logical address into a physical address using an address conversion table to perform data access to an associated area of the secondary storage device, wherein
an address space defined by the address conversion table that comprises:
 a coarsely granular address space that collectively associates, with logical addresses, a first plurality of physical addresses that are in units larger than those in which data is read; and
 a finely granular address space that associates, with logical addresses, a second plurality of physical addresses that are in units equal to those in which data is read,
wherein the controller changes part of the address conversion table that defines the finely granular address space according to the data access request and stores the address conversion table,
wherein the first plurality of physical addresses do not overlap with the second plurality of physical addresses,
wherein the first plurality of physical addresses are only used by the controller for read operations and not write operations after an initial write operation from an external source at a start of execution of an application program,
wherein an entirety of the address conversion table is stored on a built-in static random access memory, and
wherein the address conversion table occupies $(½)^{25}$ fold of a total data size of the secondary storage device.

6. A non-transitory computer readable medium having stored thereon a computer program for a computer that controls data access from a host unit to a secondary storage device in an information processing device, the computer program comprising:
by a host controller, converting a logical address of an access destination specified by the host unit into a physical address using an address conversion table; and
by a memory controller, performing data access to the secondary storage device based on the physical address, wherein
an address space defined by the address conversion table that comprises:
 a coarsely granular address space that collectively associates, with logical addresses, a first plurality of physical addresses that are in units larger than those in which data is read; and
 a finely granular address space that associates, with logical addresses, a second plurality of physical addresses that are in units equal to those in which data is read,
wherein the controller changes part of the address conversion table that defines the finely granular address space according to the data access request and stores the address conversion table,
wherein the first plurality of physical addresses do not overlap with the second plurality of physical addresses,
wherein the first plurality of physical addresses are only used by the memory controller for read operations and not write operations after an initial write operation from an external source at a start of execution of an application program,
wherein an entirety of the address conversion table is stored on a built-in static random access memory, and
wherein the address conversion table occupies $(½)^{25}$ fold of a total data size of the secondary storage device.

7. The information processing device of claim 1, wherein during the initial write operation, an address space is selected based on data characteristics of the written data.

* * * * *